US008766263B2

(12) United States Patent
Nagami

(10) Patent No.: US 8,766,263 B2
(45) Date of Patent: Jul. 1, 2014

(54) LIQUID CRYSTAL DISPLAY DEVICE

(75) Inventor: Takahiro Nagami, Mobara (JP)

(73) Assignees: Japan Display Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 238 days.

(21) Appl. No.: 13/221,111

(22) Filed: Aug. 30, 2011

(65) Prior Publication Data

US 2012/0056185 A1 Mar. 8, 2012

(30) Foreign Application Priority Data

Sep. 3, 2010 (JP) ................................ 2010-197326

(51) Int. Cl.
*H01L 31/036* (2006.01)
*G02F 1/1362* (2006.01)
*G02F 1/1343* (2006.01)
*G02F 1/1368* (2006.01)

(52) U.S. Cl.
CPC .... *G02F 1/136209* (2013.01); *G02F 1/136286* (2013.01); *G02F 1/134363* (2013.01); *G02F 2201/40* (2013.01); *G02F 1/1368* (2013.01); *G02F 2001/134318* (2013.01)
USPC 257/59; 257/72; 257/E33.053; 257/E33.064; 257/E31.126; 257/E21.476; 345/89; 345/92; 349/1; 349/2; 349/16; 349/111; 349/141

(58) Field of Classification Search
None
See application file for complete search history.

(56) References Cited

U.S. PATENT DOCUMENTS 5,346,833 A * 9/1994 Wu ................................ 438/30
8,134,155 B2 3/2012 Lim
8,310,613 B2 11/2012 Yamayoshi
8,319,928 B2 11/2012 Nagano
8,379,175 B2 2/2013 Ishii
2006/0274250 A1* 12/2006 Ono et al. .................... 349/141
2009/0180069 A1 7/2009 Nishimura
2009/0230401 A1* 9/2009 Nagano et al. ................. 257/72
2009/0303214 A1 12/2009 Kaigawa

FOREIGN PATENT DOCUMENTS

JP 2002-57343 2/2002
JP 2007-113451 5/2007
JP 2009-168878 7/2009
JP 2009-192932 8/2009
JP 2010-26269 2/2010
JP 4646244 12/2010
JP 2012-14099 1/2012

* cited by examiner

*Primary Examiner* — Yasser A Abdelaziez
(74) *Attorney, Agent, or Firm* — Antonelli, Terry, Stout & Kraus, LLP.

(57) ABSTRACT

In an IPS type liquid crystal display device having a reduced number of layers and formed through a reduced number of photolithography steps, an off current of a TFT is prevented from increasing due to photocurrent. A drain line, a TFT drain electrode, and a source electrode each have a multilayer structure including metal and a semiconductor layer. The drain line and the semiconductor layer formed thereunder are separated from the drain electrode and the semiconductor layer formed thereunder with the drain line and the drain electrode connected by a blocking conductive film formed of ITO of which the pixel electrode is also formed. Photocurrent generated by backlight is blocked by the blocking conductive film without flowing into the TFT. Therefore, the number of photomasks required in the production process can be decreased without an increase of causing the off current of the TFT.

4 Claims, 8 Drawing Sheets

LIQUID CRYSTAL DISPLAY DEVICE

CLAIM OF PRIORITY

The present application claims priority from Japanese Patent Application JP 2010-197326 filed on Sep. 3, 2010, the content of which is hereby incorporated by reference into this application.

FIELD OF THE INVENTION

The present invention relates to a liquid crystal display device, particularly to a liquid crystal display device of a lateral electric field type in which leak current from thin film transistors caused by photocurrent generated by backlight is prevented.

BACKGROUND OF THE INVENTION

Liquid crystal display panels used in liquid crystal display devices each include a TFT substrate on which pixels having pixel electrodes and thin film transistors (TFTs) are arrayed in a matrix, a counter substrate opposing the TFT substrate and having, for example, color filters formed in positions corresponding to the pixel electrodes on the TFT substrate, and liquid crystal held between the TFT substrate and the counter substrate. In such liquid crystal display panels, light transmittance through liquid crystal molecules is controlled for each pixel to generate an image to be displayed.

Liquid crystal display devices being flat and light have been expanding their applications in various fields. In mobile phones and digital still cameras (DSCs), for example, compact liquid crystal display devices are widely used. For liquid crystal display devices, a viewing angle characteristic is an important characteristic. Changes in display brightness and chromaticity observed between when the screen of a liquid crystal display device is viewed straight from the front and when it is obliquely viewed depend on the viewing angle characteristic of the liquid crystal display device. Liquid crystal display devices of an in-plane switching (IPS) type in which liquid crystal molecules are driven by a horizontal electric field show a superior viewing angle characteristic.

While there are various IPS systems (hereinafter each referred to simply as an "IPS"), those in which liquid molecules are turned by an electric field generated, in each pixel, between a flat-plane like common electrode or pixel electrode and a comb-teeth-shaped pixel electrode or common electrode formed over the flat-plane like electrode with an insulating film formed therebetween can achieve high transmittance and, hence, most widely used currently.

In manufacturing a liquid crystal display device using the above type of IPS based on existing technology, first, TFTs are formed; the TFTs are covered with a passivation film; common electrodes or pixel electrodes as described above are formed over the passivation film; and comb-teeth-shaped pixel electrodes or common electrodes are formed over them across an insulating film as described above. To meet a request for production cost reduction, however, decreasing the number of layers, for example, of conductive films and insulating films in TFT substrates has been promoted. An example IPS using a reduced number of layers in a TFT substrate is introduced in Japanese Patent Laid-Open No. 2009-168878. In the substrate structure described in the patent literature, common electrodes are formed on a layer where gate electrodes are formed, and comb-teeth-shaped pixel electrodes are formed over the common electrodes across a gate insulating film and a protective insulating film.

Forming a TFT substrate for a liquid crystal display panel, whether employing an IPS or not, used to require five photomasks. TFT substrate structures which can be formed using four submasks are disclosed, for example, in Japanese Patent Laid-Open Nos. 2006-548917 and 2002-57343.

SUMMARY OF THE INVENTION

FIG. 8 is a plan view of an IPS type TFT substrate 100 studied in connection with the present invention. FIG. 9 is a sectional view corresponding to line B-B in FIG. 8 of a liquid crystal display panel. FIG. 8 shows, not to complicate the illustration, only a portion below a pixel electrode 106 of the TFT substrate 100 without a comb-teeth-shaped common electrode 109 included therein and a counter substrate 200.

Referring to FIG. 8, a rectangular pixel electrode 106 is formed in an area surrounded by drain lines 1042 and gate lines 101. A TFT is formed on a gate line 101. A drain electrode 1041 of the TFT is formed as a branch of a drain line 1042. A source electrode 105 is formed with a channel region 1031 provided between the source electrode 105 and the drain electrode 1041. The pixel electrode 106 and the source electrode 105 are partly overlapped with each other. Referring to FIG. 8, the undersides of the drain line 1042 and source electrode 105 are entirely covered by a semiconductor layer 103 of amorphous silicon (a-Si) so as to reduce the number of photomasks required in the production process. In the TFT region, a-Si is exposed with no metal layer left thereover.

FIG. 9 is a sectional view corresponding to line B-B in FIG. 8 of the liquid crystal display panel. Referring to FIG. 9, a gate electrode 101 is formed over the TFT substrate 100 with a gate insulating film 102 formed to cover the gate electrode 101. The drain electrode 1041 and source electrode 105 are formed over the gate insulating film 102 with the semiconductor layer 103 formed between the drain electrode 1041 and source electrode 105 and the gate insulating film 102. The drain electrode 1041 and the source electrode 105 oppose each other across the channel region 1031.

The drain electrode 1041 and source electrode 105 are formed of, for example, a molybdenum-chromium alloy (MoCr). The undersides of the drain electrode 1041 and source electrode 105 are entirely covered by the semiconductor layer 103. In the channel region 1031 of the TFT, no MoCr is left. The structure as described above makes it possible to reduce the number of photomasking steps to be performed in the production process. Namely, it is possible to carry out patterning of the semiconductor layer 103 and patterning of the drain electrode 1041 (or drain line 1042) and source electrode 105 at a time.

The structure with no MoCr left in the channel region 1031 of the TFT can be formed through a single photolithography process by using half-tone exposure technology as illustrated in FIGS. 11A to 11E.

Referring to FIG. 11A, the semiconductor layer 103 and drain electrode 1041 are stacked over the gate insulating film 102. The state shown in FIG. 11A is generated by forming a resist 400 over the drain electrode 1041, and, after a halftone exposure process, developing the pattern. In the half-tone exposure process, exposure intensity is adjusted depending on target locations so as to adjust the film thickness of the resist 400.

FIG. 11B shows a state with the semiconductor layer 103 and drain electrode 1041 removed by etching from the portion not covered by the resist 400. Subsequently, the thin portion of the resist 400 is processed, for example, by a plasma asher so that the thin portion is completely removed as shown in FIG. 11C. The substrate is then etched using an etching solution for etching MoCr only as shown in FIG. 11D. When the resist 400 shown in FIG. 11D is removed, the structure as shown in FIG. 11E can be obtained. Namely, the film structure shown in FIG. 11E can be obtained using a single photomask.

Reverting to FIG. 9, the pixel electrode 106 made of indium tin oxide (ITO) is formed to be in contact with the source electrode 105. A passivation film 108 of, for example, SiN is formed covering the pixel electrode 106, drain electrode 1041, and source electrode 105. A common electrode 109 made of ITO is formed over the passivation film 108.

The common electrode 109 is formed all over the display area except where slits 1091 are formed over the pixel electrode 106. When a signal voltage is applied to the pixel electrode 106, lines of electric force passing through the slits 1091 are generated between the common electrode 109 and the pixel electrode 106. This causes liquid crystal molecules to rotate, as a result, controlling the amount of light transmitting through a liquid crystal layer 300.

Referring to FIG. 9, the counter substrate 200 is positioned over the TFT substrate 100 across the liquid crystal layer 300. On the counter substrate 200, a color filter 201 is formed in a pixel region and, in other regions, a black matrix 202 is formed as a light shielding film. An overcoat film 203 is formed covering the color filter 201 and the black matrix 202. An outer conductive film 210 of ITO is formed on the outer side of the counter substrate 200 so as to stabilize the potential inside the liquid crystal display panel.

The structure shown in FIG. 9 allows the drain line 1042 (drain electrode 1041), the source electrode 105, and the semiconductor layer 103 to be patterned at a time resulting in an advantage in terms of production cost. With the semiconductor layer 103 and the drain electrode 1041 stacked as shown in FIG. 9, however, a problem related with photocurrent occurs as shown in FIG. 10. FIG. 10 is an enlarged sectional view of a portion including the TFT and the drain electrode 1041 of FIG. 9.

As shown in FIG. 10, the TFT substrate 100 is irradiated with backlight from behind. When the semiconductor layer 103 is irradiated, at a portion thereof not corresponding to the gate electrode 101, with backlight, electrons or holes are generated. When electrons are generated, they are collected by the drain electrode 1041 in the layer above the semiconductor layer 103. When holes 10 are generated, they face a barrier and are caused to diffuse in the semiconductor layer 103 as indicated by a solid-line arrow in FIG. 10 and reach the channel region 1031 of the TFT. The holes then move through the channel region 1031 as indicated by a broken-line arrow in FIG. 10 to become a leak current from the TFT resulting in an increase of the off current of the TFT.

An object of the present invention is to prevent degradation of TFT performance caused by a photocurrent generated in cases where the TFT production cost is reduced by patterning the semiconductor layer 103 and the drain electrode 1041 (drain line 1042) or source electrode 105 at a time.

The present invention achieves the above object as follows.

(1) In a liquid crystal display device including a TFT substrate, a counter substrate, and liquid crystal held between the TFT substrate and the counter substrate: the TFT substrate has a gate electrode, a gate insulating film, and a semiconductor layer formed thereon in the cited order, the semiconductor layer having a drain electrode, a drain line, and a source electrode formed thereon except where a TFT channel region is formed; the gate insulating film has a rectangular pixel electrode of ITO formed thereon, the pixel electrode being overlappingly connected with the source electrode; the pixel electrode has a comb-teeth-shaped common electrode disposed thereon across an insulating film; and the drain electrode and the semiconductor layer thereunder are separated from the drain line and the semiconductor layer thereunder, the drain electrode and the drain line being connected by a blocking conductive film formed of the same material as the pixel electrode.

(2) In the structure in which the semiconductor layer has a drain electrode, a drain line, and a source electrode formed thereon except where a TFT channel region is formed, the source electrode is completely covered by the gate electrode as seen from behind the TFT substrate.

(3) In the structure in which the semiconductor layer has a drain electrode, a drain line, and a source electrode formed thereon except where a TFT channel region is formed, the drain electrode and the semiconductor layer thereunder are separated from the drain line and the semiconductor layer thereunder with the drain electrode and the drain line connected by the same material as the pixel electrode and with the source electrode completely covered by the gate electrode as seen from behind the TFT substrate. Namely, this structure is a combination of the above structures (1) and (2).

(4) In the structure in which the semiconductor layer has a drain electrode, a drain line, and a source electrode formed thereon except where a TFT channel region is formed, the drain electrode, the source electrode, the semiconductor layer, and the drain line have been formed using the same photomask.

According to the present invention, a drain line, a drain electrode, a source electrode, and a TFT channel region can be formed in the same photolithography process, while at the same time preventing the off current of the TFT from increasing due to photocurrent. It is, therefore, possible to realize a liquid crystal display device at low cost without degrading the TFT performance.

DESCRIPTION OF THE PREFERRED EMBODIMENT

The present invention will be described in detail below based on an embodiment thereof.

First Embodiment

Figure 1:
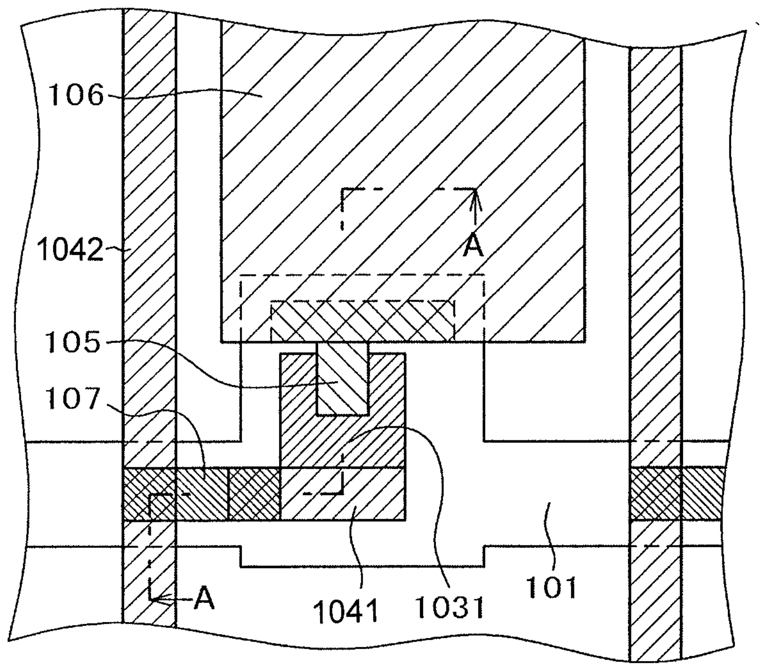
FIG. 1 is a plan view of the TFT substrate of a liquid crystal display panel according to the present invention.
Figure 2:
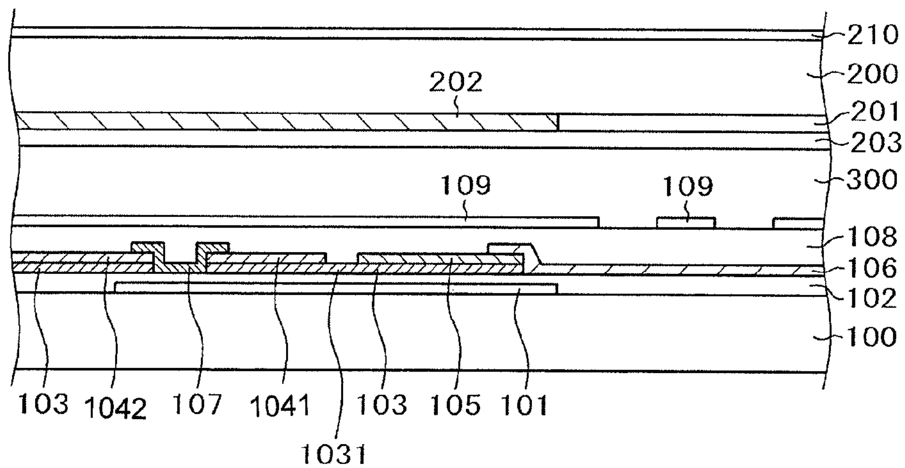
FIG. 2 is a sectional view of the TFT substrate shown in FIG. 1.

FIG. 1 is a plan view of an IPS type TFT substrate 100 according to the present invention. FIG. 2 is a sectional view corresponding to line A-A in FIG. 1 of a liquid crystal display panel. FIG. 1 shows, not to complicate the illustration, only a portion below the pixel electrode 106 of the TFT substrate 100 without the comb-teeth-shaped common electrode 109 included therein and the counter substrate 200.

Figure 8:
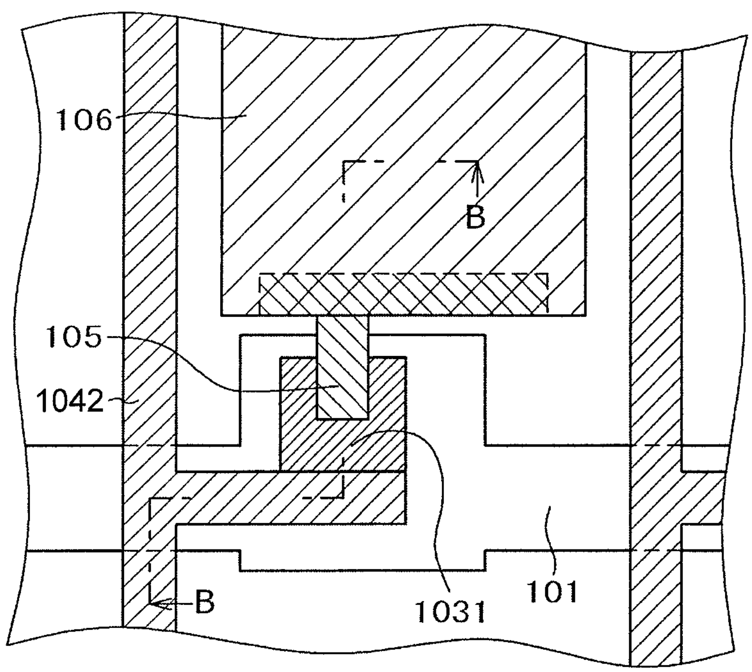
FIG. 8 is a plan view of the TFT substrate of an example liquid crystal display panel described for comparison with the present invention.

The structure shown in FIG. 1 corresponds to that shown in FIG. 8, so that descriptions of the portions of FIG. 1 identical to those of FIG. 8 will be omitted below. A difference between FIG. 1 and FIG. 8 is the structure of the drain electrode 1041. Referring to FIG. 1, the drain line 1042 and the drain electrode 1041 are separated from each other. As seen in FIG. 1, the drain line 1042 linearly vertically extends with the drain electrode 1042 separated by a predetermined distance from the drain line 1041 and extending laterally. The drain line 1042 and the drain electrode 1041 are electrically connected by a blocking conductive film 107 formed of ITO. The blocking conductive film 107 is formed at the same time as the pixel electrode 106 of ITO, so that it does not require any additional process.

Figure 9:
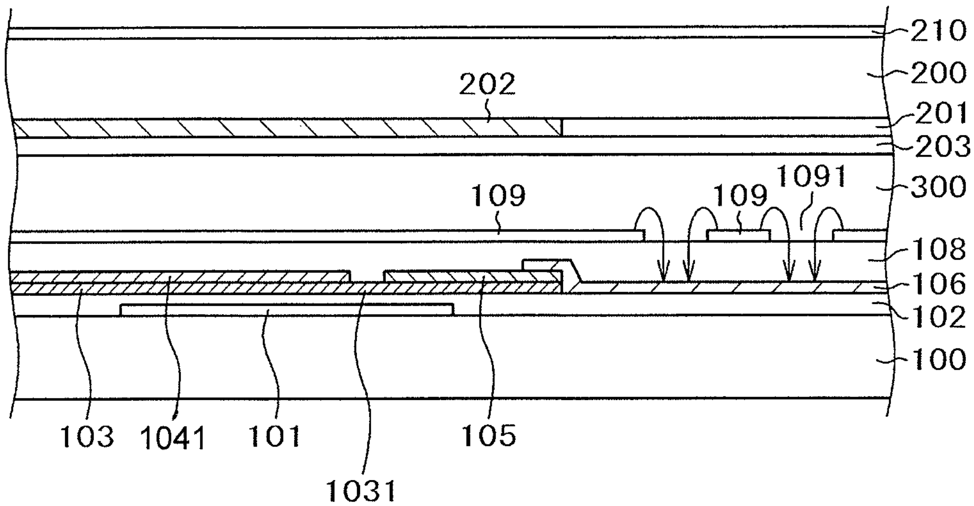
FIG. 9 is a sectional view of the TFT substrate shown in FIG. 8.

FIG. 2 is a sectional view taken along line A-A in FIG. 1. The structure shown in FIG. 2 corresponds to that shown in FIG. 9, so that descriptions of the portions of FIG. 2 identical to those of FIG. 9 will be omitted below. In the structure shown in FIG. 2, too, except where the channel region 1031 of the TFT is present, the semiconductor layer 103 is overlapped with such parts as the drain line 1042, drain electrode 1041, and source electrode 105. A difference between FIG. 2 and FIG. 9 is that the drain line 1042 and the drain electrode 1041 separated from each other are electrically connected by the blocking conductive film 107 formed of ITO. Note that where the drain line 1042 and the drain electrode 1041 are separated from each other, the semiconductor layer 103 below them is broken apart. As shown in FIG. 2, the blocking conductive film 107 is formed in the same process and at the same time as the pixel electrode 106 also of ITO.

Figure 3:
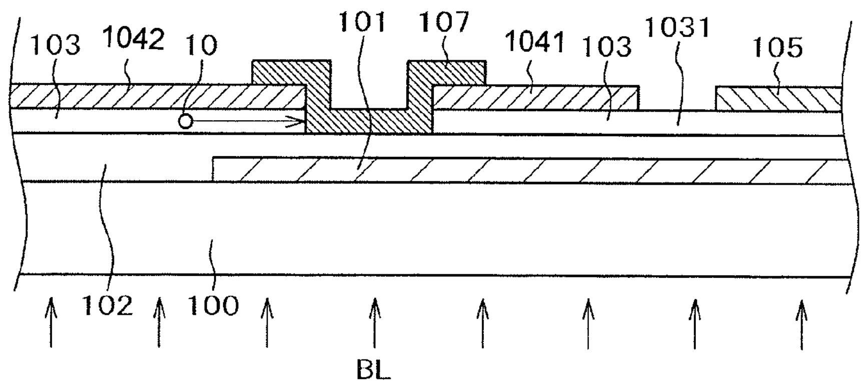
FIG. 3 is a sectional view for explaining the operation of the present invention.
Figure 10:
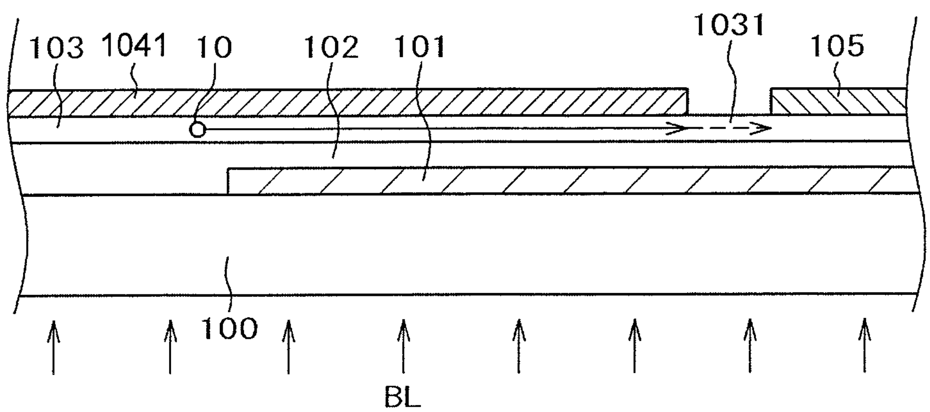
FIG. 10 is a sectional view representing a problem with existing TFT substrates.
Figure 11A:
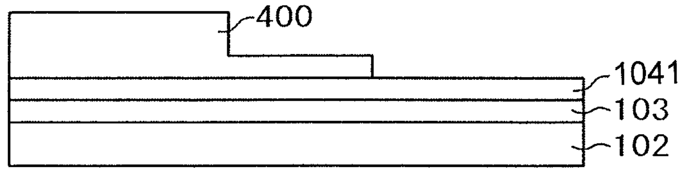
FIGS. 11A to 11E are diagrams showing a half-tone exposure process.
Figure 11B:
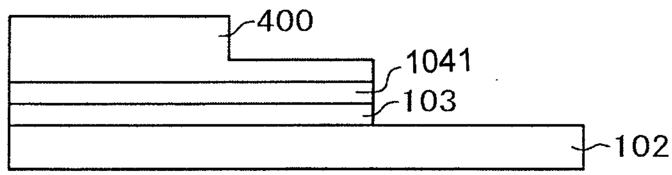
Figure 11C:
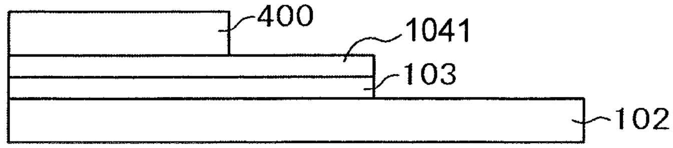
Figure 11D:
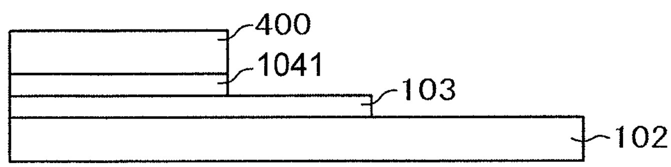
Figure 11E:
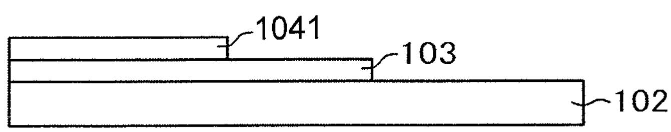

FIG. 3 is for explaining the operation of the present invention and shows an enlarged sectional view of a portion including the TFT and the drain electrode 1041 of FIG. 2. As shown in FIG. 3, the TFT substrate 100 is irradiated with backlight from behind. Where the gate electrode 101 is formed, the backlight is blocked by the gate electrode 101. When the semiconductor layer 103 is irradiated, where the gate electrode 101 is not present, with backlight, electrons or holes are generated. When electrons are generated, they are collected by the drain electrode 1041 in the layer above the semiconductor layer 103. When holes are generated, they face a barrier and are caused to diffuse in the semiconductor layer 103 as indicated by an arrow in FIG. 3 toward the TFT the same as shown in FIG. 10.

According to the present invention, however, the drain line 1042 is not continuous to the drain electrode 1041. The drain line 1042 and the drain electrode 1041 are separated from each other with the semiconductor layer 103 formed under them also broken apart correspondingly and with the blocking conductive film 107 formed of ITO electrically connecting the drain line 1042 and the drain electrode 1041. ITO whose carriers are electrons shows behavior similar to that of metal. Between the semiconductor and ITO, therefore, a barrier against holes is generated like between the semiconductor layer 103 and the drain electrode 1041.

Namely, the holes generated in the semiconductor layer 103 irradiated with backlight diffuse toward the blocking conductive film 107 and are blocked by a barrier formed between the blocking conductive film 107 and the semiconductor layer 103 before reaching the channel region 1031 of the TFT. Thus, the photocurrent generated in the semiconductor layer 103 under the drain electrode 1041 or drain line 1042 does not reach the channel region 1031 of the TFT, so that the leak current from the TFT does not increase.

Another difference between FIG. 1 and FIG. 8 is that, as seen from behind the TFT substrate, the source electrode 105 is entirely covered by the gate electrode 101. With the source electrode 105 stacked with the semiconductor layer 103, when the source electrode 105 is irradiated, from behind, with backlight, photocurrent is generated and a phenomenon similar to that described above in connection with the drain electrode 1041 occurs, causing holes 10 to reach the channel region 1031 to degrade the performance of the TFT. Namely, in the structure shown in FIG. 8, photocurrent is generated in the semiconductor layer 103 under the source electrode 105 and flows into the TFT.

In the structure shown in FIG. 1 of the present invention, on the other hand, the source electrode 105 is entirely covered by the gate electrode 101 as seen from behind the TFT substrate 100. With the gate electrode 101 serving as a light shielding film, no photocurrent is generated by the backlight emitted from behind the TFT substrate 100. According to the present invention, therefore, no photocurrent to flow into the TFT from the source electrode 105 side is generated, so that degradation of the TFT performance resulting from photocurrent generation can be prevented.

Figure 4:
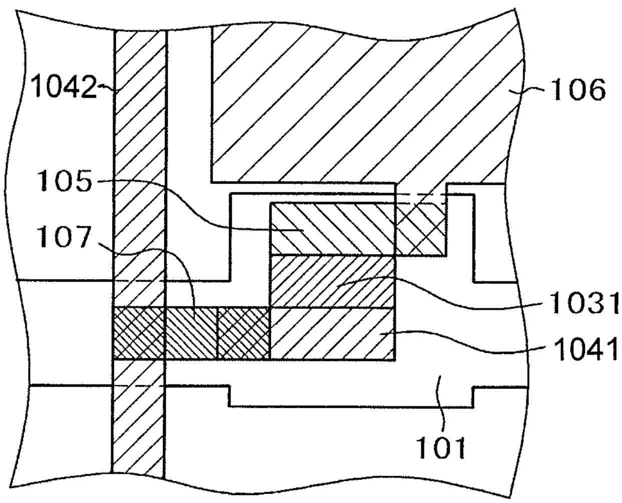
FIG. 4 is a plan view showing a first modification example of the present invention.

FIG. 4 shows a first modification example of the present invention. FIG. 4 differs from FIG. 1 in that the source electrode 105 and the drain electrode 1041 face each other over a larger area than in FIG. 1. In the structure shown in FIG. 4, therefore, the on current of the TFT can be made larger. In the structure shown in FIG. 4, too, the drain electrode 1041 and the drain line 1042 are separated from each other and, where they are separated from each other, the semiconductor layer 103 under them is broken apart. Also like in FIG. 1, the drain electrode 1041 and the drain line 1041 separated from each other are electrically connected by the blocking conductive film 107 formed of ITO. Furthermore, the portion stacked with each other of the source electrode 105 and the semiconductor layer 103 are entirely covered by the gate electrode 101 as seen from behind the TFT substrate 100, so that no photocurrent is generated in the source electrode 105. Hence, the effect obtained in the structure shown in FIG. 1 can also be obtained in the structure shown in FIG. 4.

Figure 5:
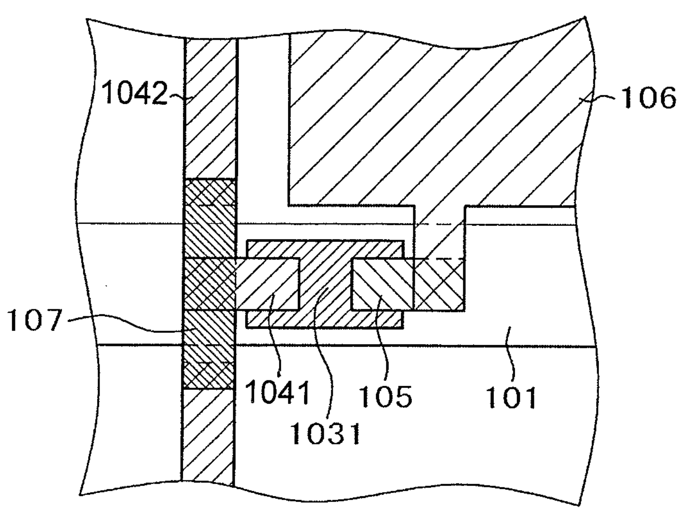
FIG. 5 is a plan view showing a second modification example of the present invention.

FIG. 5 shows a second modification example of the present invention. FIG. 5 differs from FIG. 1 in that the drain line 1042 is broken apart with the semiconductor layer 103 thereunder also broken apart correspondingly and with the broken apart portions of the drain line 1042 electrically connected by the blocking conductive film 107. In this structure, the TFT can be formed near the drain line 1042, so that pixel transmittance can be increased. In this structure, too, the photocurrent generated in the drain line 1042 is blocked by the blocking conductive film 107. Also, the source electrode 105 is entirely covered by the gate electrode 101 as seen from behind the TFT substrate 100, so that no photocurrent is generated in the source electrode 105. It must be noted, however, that, in the structure shown in FIG. 5, the drain line 1042 is partly formed of ITO increasing the resistance of the drain line 1042.

Figure 6:
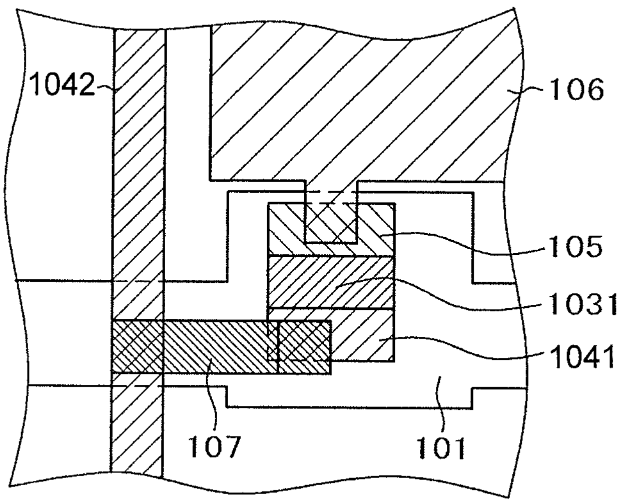
FIG. 6 is a plan view showing a third modification example of the present invention.

FIG. 6 shows a third modification example of the present invention. The structure shown in FIG. 6 is similar to that shown in FIG. 4, but the drain electrode 1041 and the source electrode 105 can be made smaller in the structure shown in FIG. 6. This makes it possible to achieve a higher pixel transmittance in the structure shown in FIG. 6 than in the structure shown in FIG. 4.

Figure 7:
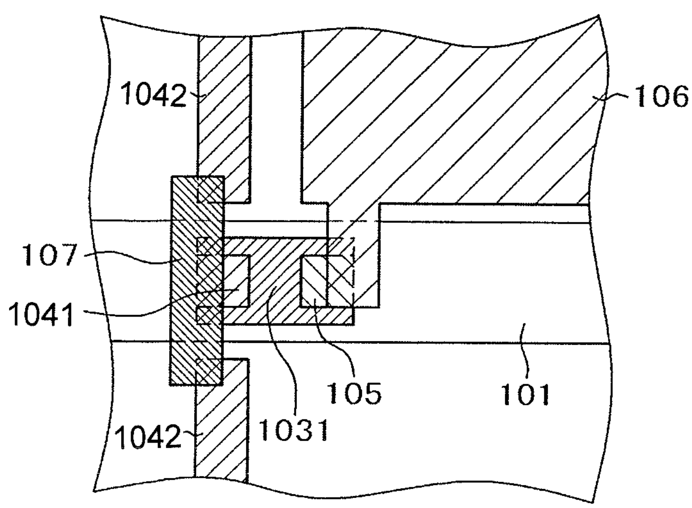
FIG. 7 is a plan view showing a fourth modification example of the present invention.

FIG. 7 shows a fourth modification example of the present invention. The structure shown in FIG. 7 is similar to that shown in FIG. 5, but the TFT can be formed closer to the drain line 1042 in the structure shown in FIG. 7. Therefore, as compared with the structure shown in FIG. 5, the pixel transmittance can be further increased in the structure shown in FIG. 7.

As described above, according to the present invention, TFT performance degradation due to photocurrent generation can be prevented and, at the same time, the semiconductor layer 103, the drain line 1042 or drain electrode 1041, and the source electrode 105 can be patterned in a single photolithography process, so that the liquid crystal device production cost can be reduced.

What is claimed is:

1. A liquid crystal display device including a TFT substrate, a counter substrate, and liquid crystal held between the TFT substrate and the counter substrate, wherein the TFT substrate has a gate electrode, a gate insulating film, and a semiconductor layer formed thereon in the cited order, the semiconductor layer having a drain electrode, a drain line, and a source electrode formed thereon except where a TFT channel region is formed;

the gate insulating film has a rectangular pixel electrode of ITO formed thereon, the pixel electrode being overlappingly connected with the source electrode;

the pixel electrode has a comb-teeth-shaped common electrode disposed thereon across an insulating film;

the drain electrode on the semiconductor layer and the drain line on the semiconductor layer are electrically connected by a blocking conductive film formed of the same material as the pixel electrode; and the semiconductor layer under the drain electrode and the semiconductor layer under the drain line are physically connected by the blocking conductive film and are separated by the blocking conductive film as a barrier against holes; and the blocking conductive film which separates the semiconductor layer under the drain electrode and the semiconductor layer under the drain line is completely overlapped with the gate electrode in plan view.

2. The liquid crystal display device according to claim 1, wherein the source electrode is completely covered by the gate electrode as seen from behind the TFT substrate.

3. The liquid crystal display device according to claim 1, wherein the drain electrode, the source electrode, the semiconductor layer, and the drain line are formed using the same photomask.

4. The liquid crystal display device according to claim 2, wherein the drain electrode, the source electrode, the semiconductor layer, and the drain line are formed using the same photomask.

* * * * *